Sept. 30, 1930.  G. E. MOEN  1,777,047
TOOL FOR REAMING AND FITTING VALVE SEATS
Filed Dec. 23, 1927  2 Sheets-Sheet 1
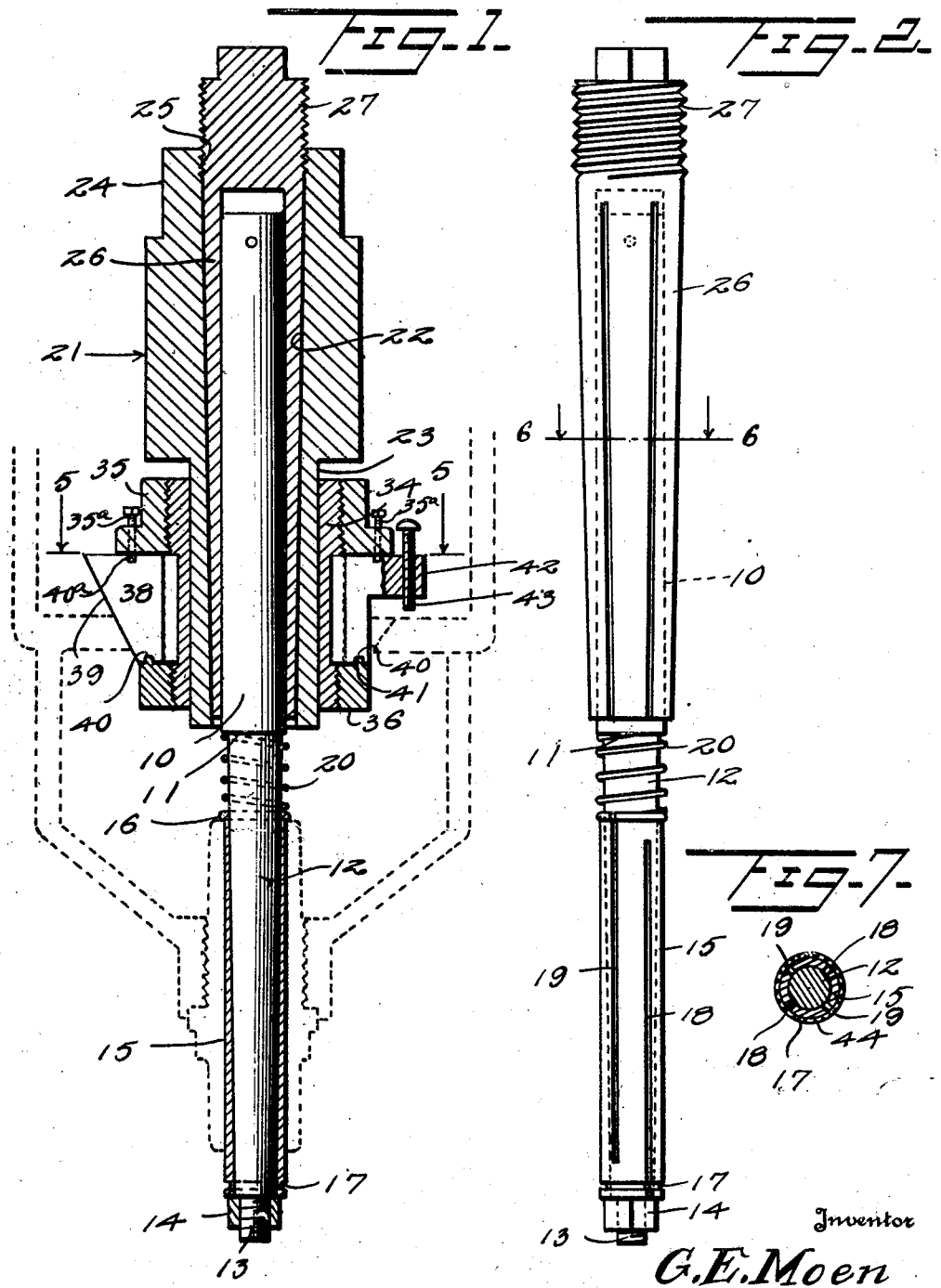

Sept. 30, 1930. G. E. MOEN 1,777,047
TOOL FOR REAMING AND FITTING VALVE SEATS
Filed Dec. 23, 1927 2 Sheets-Sheet 2
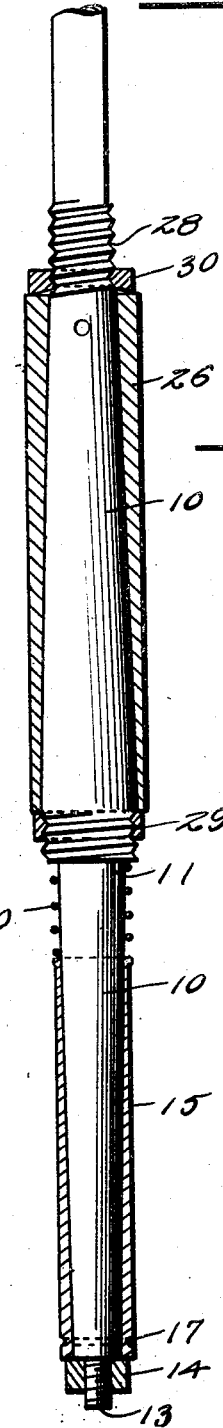
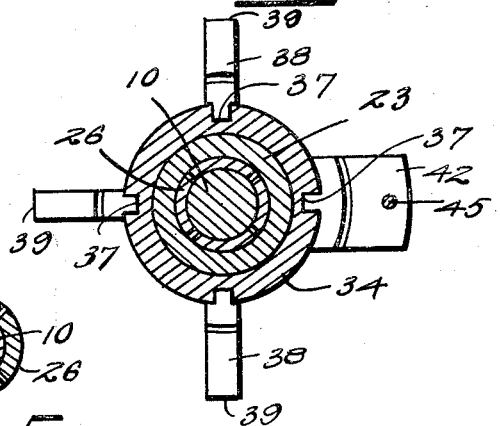
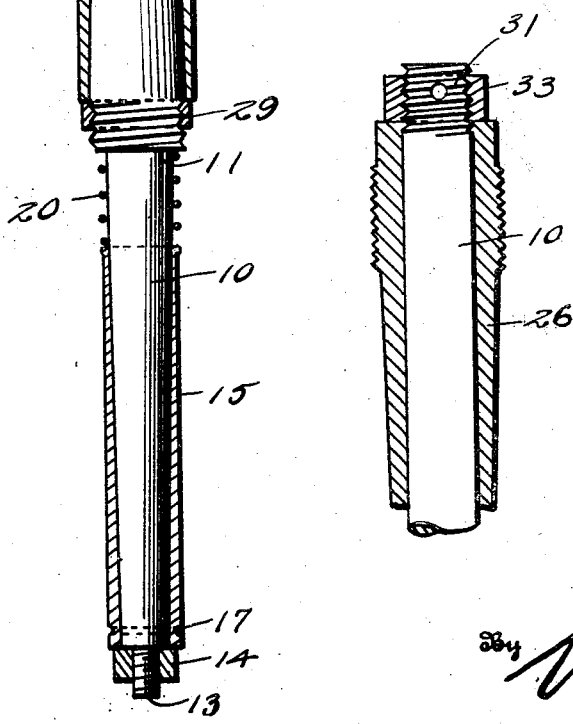
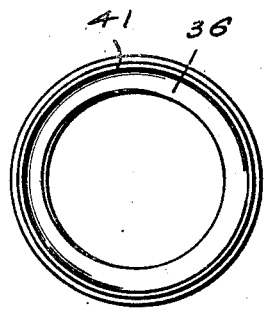
Inventor
G. E. Moen
By Watson E. Coleman
Attorney Patented Sept. 30, 1930

1,777,047

UNITED STATES PATENT OFFICE

GEORGE E. MOEN, OF KELSO, WASHINGTON

TOOL FOR REAMING AND FITTING VALVE SEATS

Application filed December 23, 1927. Serial No. 242,188.

This invention relates to tools for reaming and fitting valve seats of internal combustion engines.

An important object of the invention is to provide a novel and improved pilot construction, whereby the pilot may be made to fit accurately in valve stem guides which are worn or of different diameters.

A further object of the invention is to provide a novel and improved tool holder construction whereby the tools may be held in a desired adjusted position, and whereby compensation may be had for wear upon the pilot.

A still further object of the invention is the improvement of a novel and improved means for mounting the tools upon the tool holder and of a novel and improved tool construction for use in connection with valve seat repairs.

These and other objects I attain by the construction shown in the accompanying drawings, wherein for the purpose of illustration is shown a preferred embodiment of my invention and wherein:—

Figure 1 is an enlarged vertical sectional view of a valve seat reaming and fitting tool constructed in accordance with my invention Figure 2 is a side elevation of the spindle Figure 3 is a view showing a slightly modified form of the spindle;

Figure 4 is a detail sectional view showing a modification of the type of spindle shown in Figure 1

Figure 5 is a section on the line 5—5 of Figure 1

Figure 6 is a section on the line 6—6 of Figure 2;

Figure 7 is a detail sectional view illustrating the use of a split ring for holding the valve stem guide engaging bushing in retracted position;

Figure 8 is a plan view of the nut employed for clamping the tool elements of the tool.

Referring now more particularly to the drawings, the numeral 10 generally designates a pilot which consists of a shaft provided at its approximate middle with a shoulder 11, which is formed by reducing one end of the shaft. The reduced end of the shaft is tapered toward its extremity, as indicated at 12, and has this extremity, indicated at 13, exteriorly screw-threaded for the reception of a nut 14. Mounted upon the reduced tapered portion of the shaft is a sleeve 15, the wall of which tapers from its outer toward its inner end with a taper similar to the taper of the shaft. The inner or thinner end of the sleeve is provided with an enlargement 16, while the outer or thicker end thereof is formed with an annular groove 17. The sleeve is constructed in any suitable manner, so that a substantially uniform circumferential expansion thereof may be obtained when the sleeve is shifted longitudinally upon the tapered end of the shaft. In the present instance, the sleeve is shown as provided with diametrically opposed pairs of slots 18 and 19, the slots 18 opening through the thicker end of the sleeve and extending nearly to the thinner end thereof, while the slots 19 open through the thinner end of the sleeve and extend nearly to the thicker end thereof. Between the shoulder 11 and the head 16 of the sleeve, a spring 20 surrounds the shaft and constantly urges the thicker end of the sleeve into engagement with the nut.

Surrounding the upper end of the shaft is a tool holder, generally designated at 21. This tool holder is in the form of a body having a central bore 22 and having its lower end reduced, as indicated at 23, for the reception of a tool. Any suitable means for connecting the tool to this reduced end may be provided. The upper end of the body is formed as a nut 24 that is, is many sided and the upper end of the bore of the body is preferably screw-threaded, as indicated at 25. The bore of the body and the exterior of the pilot shaft are so formed that a tapering annular space is provided therebetween. In Figure 1, the bore of the body is shown as tapered while the shaft is straight. In Figure 3, the bore of the body is straight and the shaft is tapered. A tapered split sleeve 26 is provided to fit in this space and means are provided whereby this tapered split sleeve may be adjusted longitudinally of the space. In the construction shown in Figures 1 and 2, adjustment is attained by threading the exterior of the sleeve at 27 at its larger end for coaction with the threads 25 of the bore of the tool holder 21, while in Figure 3, the shaft is shown as having threaded portions 28 and 29 upon which are mounted nuts 30 for adjusting the sleeve longitudinally. The construction shown in Figures 1 and 2 is preferred, since it permits a modification of the structure as illustrated in Figure 4. In this figure, the end of the shaft is shown as extended through the upper end of the sleeve 26 and exteriorly screw-threaded at 31 for the reception of a nut 33, by means of which the sleeve and the tool holder mounted thereon may be shifted longitudinally of the shaft as a unit.

The tool employed preferably comprises a sleeve 34 interiorly constructed to fit the reduced portion 23 of the tool holder and to be secured thereto. The exterior of this sleeve has its ends screw-threaded for the reception of nuts 35 and 36. The outer face of the tool holder between the threaded portions is vertically slotted, as indicated at 37, to receive the reamers employed. Each reamer consists of a metallic body 38 having its outer face 39 constructed as a cutting face. The upper and lower end edges are adapted to abut the nuts 35 and 36 and at least one of these edges is provided with a socket 40 for the reception of a retaining element 41 carried by the nut. In the present instance, the tool elements have been disclosed as provided with transverse grooves in these end faces and the nut as provided with an annular rib for engagement in these faces. Both nuts may be constructed in this manner, if desired. The grooves 37 are preferably provided in a sufficient number to support reamers of all of the angles which it is desired to impart to the valve face. An ordinary valve face has an intermediate angle, which forms the actual seat for the valve and at the end edges greater and less than the intermediate angle forming fillets eliminating sharp edges. If, for example, the angle of the valve employed is 45° to the vertical or the axis of the valve stem guide, three reamer blades will preferably be employed, one having an angle of 45° and the others having angles of 75° and 15° respectively. In addition to the grooves for the reception of such reamers, a further groove is provided receiving a metallic body similar to the reamer body and providing a support 42 for an adjustable stop screw 43 which, by its contact with the surface in which the seat is formed, will limit the cutting action. In the present instance, the nut 35 is disclosed as having directed through the flange thereof securing elements 35ª engaging in slots 40ª formed in the upper ends of the tool elements.

In the use of a device of this character, the pilot is inserted in the guide until the head 16 engages the upper end of the valve stem guide of the engine. The pilot is then forced downwardly as by tapping the same with a hammer until it is rigidly clamped by the bushing. The tool holder is then mounted upon the upper end of the pilot and adjustment of the split sleeve 26 made until the tool holder fits thereon without any looseness. The tool is mounted upon the tool holder and secured thereto and the tool holder bodily rotated. In event a construction such as shown in Figure 4 is employed, if the cutting operation is slow, due to dull tools or stubborn material, the tool holder may be positively fed longitudinally of the pilot by adjustment of the nut 33. When the reaming operation, with the use of a tool such as described may be completed in one operation, which is completed, the tool holder is removed and the nut 14 loosened. The shaft 10 is then rotated to free the pilot from the bushing and may be bodily removed. In event difficulty is met with in inserting the sleeve 15 in the bore of the valve stem guide, this sleeve may be compressed and held in its compressed position by means of a split ring 44. When the operation is completed, the pilot may be released by tapping upwardly upon the lower end thereof while rotating the same by means of a pin inserted through the upper end thereof.

Since the construction hereinbefore set forth is capable of a certain range of change and modification without materially departing from the spirit of the invention, I do not limit myself to such specific structure except as hereinafter claimed.

I claim:

1. In a device for reaming and fitting the valve seats of internal combustion engines, a pilot comprising a shaft formed with a shoulder intermediate its ends and having one end thereof reduced and tapered toward its extremity, a split bushing the wall of which is oppositely similarly tapered mounting thereon, a spring extending between the shoulder and the inner end of the split bushing, means at the inner end of the bushing to engage the upper end of a valve stem guide through which the bushing is directed to thereby shift the bushing toward the shoulder whereby by forcing the pilot through the bushing said pilot may be clamped in the valve stem guide opening of an internal combustion engine and a tool holder rotatably mounted upon the opposite end of the shaft.

2. In a device for reaming and fitting the valve seats of internal combustion engines, a pilot comprising a shaft formed with a shoulder intermediate its ends and having one end thereof reduced and tapered toward its extremity, a split bushing the wall of which is oppositely similarly tapered mounted thereon, a spring extending between the shoulder and the inner end of the split bushing, means at the inner end of the bushing to engage the upper end of a valve stem guide through which the bushing is directed to thereby shift the bushing toward the shoulder whereby by forcing the pilot through the bushing said pilot may be clamped in the valve stem guide opening of an internal combustion engine and a tool holder rotatably mounted upon the opposite end of the shaft, said bushing having pairs of diametrically opposed slots, each pair of slots opening through one end of the bushing and extending to a point adjacent the opposite end thereof, alternate pairs opening through opposite ends of the bushing.

3. In a device for reaming and fitting the valve seats of internal combustion engines, a pilot comprising a shaft formed with a shoulder intermediate its ends and having one end thereof reduced and tapered toward its extremity, a split bushing the wall of which is oppositely but similarly tapered mounted thereon, a spring extending between the shoulder and the inner end of the split bushing, means at the inner end of the bushing to engage the upper end of a valve stem guide through which the bushing is directed to thereby shift the bushing toward the shoulder whereby by forcing the pilot through the bushing said pilot may be clamped in the valve stem guide opening of an internal combustion engine, a tool holder rotatably mounted upon the opposite end of the shaft and means for retaining the bushing upon the shaft comprising a nut mounted upon said extremity.

4. In a device for reaming and fitting the valve seats of internal combustion engines, a pilot comprising a shaft formed with a shoulder intermediate its ends and having one end thereof reduced and tapered toward its extremity, a split bushing the wall of which is oppositely similarly tapered mounted thereon, a spring extending between the shoulder and the inner end of the split bushing, means at the inner end of the bushing to engage the upper end of a valve stem guide through which the bushing is directed to thereby shift the bushing toward the shoulder whereby by forcing the pilot through the bushing said pilot may be clamped in the valve stem guide opening of an internal combustion engine, a tool holder rotatably mounted upon the opposite end of the shaft, the opposite end of the bushing having an annular groove and a split ring engageable in said groove to hold the bushing compressed.

5. In means for reaming and fitting valve seats of internal combustion engines, a pilot having means at one end whereby it may be rigidly secured in the valve stem guide opening of an internal combustion engine, a tool holder surrounding the opposite end of the pilot in spaced relation thereto, the confronting faces of the pilot and tool holder being so formed as to provide a downwardly tapered annular space therebetween, and a split bushing disposed in said space and fitting therein and having screw-threaded engagement with the tool holder, thereby providing screw-threaded engagement with the pilot and engaging against the bushing for adjustment of said bushing longitudinally of the space.

6. In means for reaming and fitting valve seats of internal combustion engines, a pilot having means at one end whereby it may be rigidly secured in the valve stem guide opening of an internal combustion engine, a tool holder surrounding the opposite end of the pilot in spaced relation thereto, the confronting faces of the pilot and tool holder being so formed as to provide a downwardly tapered annular space therebetween a split bushing in said space and fitting therein, means engaging the bushing of the pilot for positively adjusting said bushing longitudinally of the space and means for positively forcing said bushing and tool holder as a unit toward the first named end of the pilot.

7. In means for reaming and fitting the valve seats of internal combustion engines, a pilot having means at one end whereby it may be rigidly secured in the valve stem guide opening of an internal combustion engine, a tool holder surrounding the opposite end of the pilot in spaced relation thereto, the confronting faces of the pilot and tool holder being so formed as to provide a downwardly tapered annular space therebetween, a split bushing disposed in said space and fitting therein, and having screw-threaded engagement with the tool holder, the last named end of the pilot being threaded and extended through the end of the bushing and a nut adjustable upon the threads thereof engaging the bushing.

8. In a tool of the character described, a pilot comprising a shaft formed with a shoulder intermediate its ends, a split bushing slidably mounted upon the pilot at the lower end thereof, a stop on the lower end of the pilot limiting the downward movement of the bushing, a spring bearing against the shoulder at one end and at the other end bearing against the pilot and urging it downward and a tool holder rotatably mounted upon the shaft above the shoulder.

9. In a tool of the character described, a pilot, a cutting tool operatively mounted upon the pilot, a tapered bushing slidingly mounted upon the lower end of the pilot below the cutting tool, a stop at the lower end of the pilot limiting the downward movement of the bushing, and a spring bearing at one end against the pilot and at the other end bearing against said bushing and urging the bushing downward against the stop, the bushing being independently movable vertically upon the pilot with relation to the cutting tool.

In testimony whereof I hereunto affix my signature.

GEORGE E. MOEN.